United States Patent Office 3,253,877
Patented May 31, 1966

3,253,877
ACRYLONITRILE-VINYL CHLORIDE COPOLYMER TEXTILE MATERIALS DYED WITH BLACK CATIONIC DYESTUFFS
James M. Straley and David J. Wallace, Kingsport, Tenn., assignors to Eastman Kodak Company, Rochester, N.Y., a corporation of New Jersey
No Drawing. Filed May 24, 1963, Ser. No. 282,842
8 Claims. (Cl. 8—55)

This invention relates to textile materials having a basis of a modacrylic polymer containing at least 35% but less than 85% of acrylonitrile units by weight dyed a black shade which has good fastness properties and to the dyeing of said textile materials.

For purposes of simplification, the term modacrylic will be used hereinafter to refer to "modacrylic polymer containing at least 35% but less than 85% of acrylonitrile units by weight."

There is a need for dyes which will yield black dyeings on modacrylic materials which have good fastness properties, such as good fastness to light, washing and sublimation, for example.

Black dyeings are usually produced by using appropriate combinations of red, blue and yellow dyes. It is difficult to obtain black dyeings on textile materials made of or containing modacrylic polymers because the dyes needed to produce a black shade have varying effinity for modacrylic polymers. The fastest dyeing component tends to occupy the active dyeing sites. Thus, insufficient amounts of the other dyes needed to produce a black shade may be absorbed. If this happens, a black shade is not produced.

The difficulty just noted is overcome in the present invention because the dye compounds employed by us dye modacrylic polymers black. Mixtures of dyes of different colors are not involved. Thus, the problem of having the textile material absorb the proper amount of dye of each color to yield a black shade is not involved. Also it is to be noted that when a combination of dyes is required to obtain a particular color the color is more subject to change. To illustrate, if one of the dye components is not as fast to washing, for example, as the other components and the dyed material is washed the color will be altered. The same would be true with respect to fastness to light, sublimation, gas and dry cleaning, for example.

One or more than one of the black dye compounds employed by us can be used to dye modacrylic polymer materials black.

Dye compounds which yield black dyeings without the necessity of other dyes are unusual in any line of dyestuffs. By means of our invention wanted jet black dyeings which have good fastness to light, washing and sublimation, for example, can be obtained on modacrylic polymer textile materials.

We have discovered that the cationic compounds which when the anion is chloro have the formula:

(I)
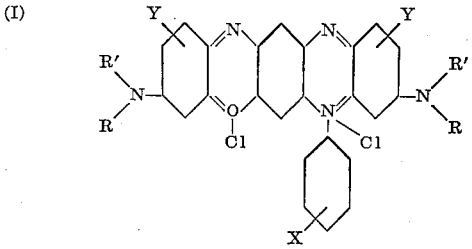

wherein R and R' each represent alkyl or substituted alkyl and X and Y each represent a hydrogen atom, a chlorine atom, a methyl radical or a methoxy group yield black dyeings on modacrylic polymer textile materials which have good fastness to light, washing and sublimation, for example. By means of these compounds jet black dyeings having good fastness properties can be obtained on modacrylic polymer textile materials.

The compounds having the Formula I are prepared by reacting a nitroso derivative of a tertiary aromatic amine with a m-oxydiphenylamine in accordance with the process of German Patent 50,612 (Friedländer, 2, 184). The dye compounds employed by us are believed to have the structure shown in Formula I, which conforms with the formula shown for Color Index dye No. 51,215.

The compounds employed by us are not satisfactory for dyeing textile materials made of acrylic polymers fast black shades. The term acrylic polymer refers to a polymer containing at least 85% by weight of acrylonitrile.

Modacrylic fibers containing at least 35% but less than 85% of acrylonitrile units by weight include modified polyacrylonitrile fibers sold on the market as Dynel and Verel. Dynel is the name for a synthetic fiber made by copolymerization of 40% acrylonitrile and 60% vinyl chloride according to the "Handbook of Material Trade Names" by Zimmerman and Lavine. Verel modacrylic fibers are more particularly described in U.S. Patents 2,811,409; 2,831,826 and 2,843,572. The dyeing of other modacrylic fibers containing at least 35% but less than 85% of acrylonitrile units by weight in addition to those specifically mentioned and the black dyed fibers thereby obtained are included within the scope of our invention.

Dyeing is carried out in accordance with known methods for dyeing modacrylic textile materials. The methods disclosed in U.S. Patents 2,957,010 and 2,968,661, for example, can be used. In some instances it has been found helpful to use a dyeing assistant or "carrier," such as an aqueous emulsion of tributyl-(n)-phosphate or DSP–112 (a product of Union Carbide), for example.

The following examples illustrate the invention.

Example 1

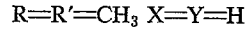
R=R'=CH₃ X=Y=H 8.7 grams of N,N-dimethyl-p-nitrosoaniline hydrochloride, 3.5 grams of 3-hydroxydiphenylamine, and 20 cc. of ethyl alcohol were brought to the boil. A vigorous reaction ensued, and the heat was removed. After cooling, 2 cc. of concentrated hydrochloric acid followed by 2 grams of ZnCl₂ and 2 grams of NaCl were added. The ethyl alcohol was decanted from the gummy precipitate which was slurried in 300 cc. of hot water. ZnCl₂ and NaCl were added until no more precipitate was formed. The product was filtered off, washed with a 10% aqueous solution until the yellowish effluent was colorless and dried in vacuo at 50° C., 8.4 grams of dye product were obtained.

Example 2

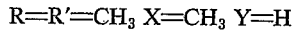
R=R'=CH₃ X=CH₃ Y=H 4.35 grams of N,N-dimethyl-p-nitrosoaniline hydrochloride, 1.9 grams of 3-hydroxy-4'-methyldiphenylamine, and 10 cc. of methyl alcohol were brought to boiling. After the first vigorous reaction was over, heating was resumed and the reaction mixture was refluxed for 30 minutes. The reaction mixture was then drowned in 200 cc. of water, 5 grams of ZnCl₂ and 10 grams of NaCl added and the resulting mixture was allowed to stand overnight. The dye product was isolated as in Example 1. The methyl group (X) is in the para position to the nitrogen atom to which the phenyl nucleus containing it is joined.

Example 3

R=R'=CH₃ X=OCH₃ Y=H

Example 2 was repeated except that 2.1 grams of 3-hydroxy-4'-methoxydiphenylamine were used in place of the 1.9 grams of 3-hydroxy-4'-methyldiphenylamine. The methoxy group is in the para position to the nitrogen atom to which the phenyl nucleus containing it is joined.

Example 4

R=C₂H₅ R'=—CH₂CH₂CN X=H Y=CH₃

5.93 grams of the hydrochloride of 3-methyl-4-nitroso-N-ethyl-N-β-cyanoethylaniline, 1.75 grams of 3-hydroxydiphenylamine, and 10 cc. of methyl alcohol were treated as in Example 2. The yield of dye product obtained was 6.3 grams. In each case, the methyl group is in the free meta position with respect to the respective

groupings.

Example 5

R=C₂H₅ R'=CH₂CH₂CN X=Cl Y=CH₃

Example 4 was repeated except that 2.1 grams of 3-hydroxy-3'-chlorodiphenylamine were used in place of the 1.75 grams of 3-hydroxydiphenylamine. The yield of dye product obtained was 6.2 grams. In each case, the methyl group is in the free meta position with respect to the respective

groupings.

Example 6

R=R'=CH₂CH₂OH X=Y=H 5 grams of the hydrochloride of 4-nitroso-N,N-di-(β-hydroxyethyl)aniline, 1.85 grams of 3-hydroxydiphenylamine, and 10 cc. of ethyl alcohol were treated as in Example 2. 4.4 grams of the dye product were collected.

In Examples 1–6 the materials isolated are believed to be the zinc chloride complexes of the dyes. There is no indication that the zinc chloride contributes to the color or any other property of the dye.

alkylphenoxypoly(ethyleneoxy)ethanol] using 10% solutions of each. Warm demineralized water was added and a clear solution was obtained. The ratio of dye liquor to the modacrylic textile fabric to be dyed was 30:1. 6% (O.W.F.) Verel modacrylic dyeing assistant, which is an aqueous emulsion of tributyl-(n)-phosphate, was added and then the Verel modacrylic textile fabric to be dyed. The dye bath was worked 10 minutes, the temperature raised to 95° C. and working continued for one hour at 95° C. The dyebath was cooled slowly to about 25° C.–40° C. temperature and then the dyed fabric was removed, rinsed well with water and immediately dried at 120° C. A deep, jet black dyeing having good fastness to light, washing and sublimation was obtained.

Example 8

The procedure of Example 7 was followed except that the goods used were a Dynel modacrylic fabric, the temperature was at the boil and the carrier used was amyl phosphate. A jet black dyeing having good fastness to light, washing and sublimation was obtained.

Example 9

The procedure of Example 7 was followed in dyeing a fabric made of Acrilan acrylic polymer (Acrilan 16) except that the goods were dyed at the boil with no carrier. Several runs were made. The darkest-colored fabric obtained was no darker than a grey.

Example 10

100 mg. of the product of Example 1 was pasted with 10 cc. of ethylene glycol monomethyl ether at 60° C. Hot water was added to a total of 300 cc. of 5 cc. of 10% formic acid were added followed by 10 grams of an Orlon 42 acrylic fabric. The goods were dyed at the boil for 1.5 hours. A grey dyeing was obtained.

Example 11

The Verel modacrylic fabric of Example 7 was replaced by an Orlon 42 acrylic fabric. A darker shade than that of Example 10 but by no means a black was obtained.

The foregoing examples are illustrative and not limitative of our invention. Numerous other compounds having the Formula I can be prepared and used to dye modacrylic polymer materials black. The following tabulation sets forth additional black dye compounds that can be prepared in accordance with the general procedure described hereinbefore.

| Ex. No. | Reactants | R | R' | X | Y |
|---|---|---|---|---|---|
| 12 | N,N-diethyl-p-nitrosoaniline hydrochloride and 3-hydroxydiphenylamine. | —C₂H₅ | —C₂H₅ | H | H |
| 13 | N-ethyl-N-n-butyl-p-nitrosoaniline hydrochloride and 3-hydroxydiphenylamine. | —C₂H₅ | n-C₄H₉ | H | H |
| 14 | N-ethyl-N-β-methoxy-ethyl-p-nitrosoaniline hydrochloride and 3-hydroxydiphenylamine. | —C₂H₅ | —CH₂CH₂OCH₃ | H | H |
| 15 | N-ethyl-N-β-ethoxy-ethyl-p-nitrosoaniline hydrochloride and 3-hydroxydiphenylamine. | —C₂H₅ | —CH₂CH₂OC₂H₅ | H | H |
| 16 | N-β-hydroxyethyl-N-β-cyanoethyl-p-nitrosoaniline hydrochloride and 3-hydroxydiphenylamine. | CH₂CH₂OH | —CH₂CH₂CN | H | H |
| 17 | N-ethyl-N-β-hydroxypropyl-p-nitrosoaniline hydrochloride and 3-hydroxydiphenylamine. | —C₂H₅ | —CH₂CHOHCH₃ | H | H |

Example 7

In this example the dye mixture referred to is a mixture of dye and dispersing agent (sodium lignin sulfonate) in finely divided condition. ⅓ of the dye mixture by weight is dye while ⅔ of the dye mixture by weight is dispersing agent. 6% (O.W.F.) (on the weight of the fabric) of a dye mixture containing 2% (O.W.F.) of the dye of Example 1 was pasted with 1% (O.W.F.) formic acid and 1% (O.W.F.) Igepal CA [Antara Chemicals, an As understood by those skilled in the art a dispersing agent other than sodium lignin sulfonate can be admixed with the dye. Similarly zinc sulfate can be used in place of zinc chloride. Also, as shown by German Patent 50,612, another salt of the nitrosoaniline compound can be used instead of the hydrochloride salt, such as the sulfuric acid salt, for example.

The nature of the anion present in the dye compound is not material as is well known in the dye art and the cationic dye is usually made in the form of a salt. The nature of the salt also is not critical since in the dyeing process the nature of the dye cation is the important aspect.

The modacrylic polymer materials can also be dyed under pressure using known techniques. Our invention is particularly directed to the dyeing of modacrylic polymer textile materials. The modacrylic polymer textile material can be dyed in any desired form, for example, in the form of yarn, filament, staple fiber or fabric. The modacrylic polymer material can also be dyed in other forms, for example, in the form of sheets and films.

Although the invention has been described in considerable detail with reference to certain preferred embodiments thereof, variations and modifications can be effected within the spirit and scope of the invention as described hereinbefore and as defined in the appended claims.

We claim:

1. Modacrylic polymer material made by the copolymerization by weight of 40% acrylonitrile and 60% vinyl chloride dyed black with a cationic compound which when the anion is chloro has the formula:

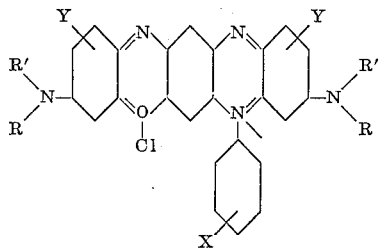

wherein R and R' each represent a member selected from the group consisting of alkyl and unsubstituted alkyl and X and Y each represent a member selected from the group consisting of a hydrogen atom, chloro, methyl and methoxy.

2. Modacrylic polymer textile material made by the copolymerization by weight of 40% acrylonitrile and 60% vinyl chloride dyed black with a cationic compound defined in claim 1.

3. Modacrylic polymer textile material made by the copolymerization by weight of 40% acrylonitrile and 60% vinyl chloride dyed black with a cationic compound defined in claim 1 wherein R and R' are methyl and X and Y are hydrogen.

4. Modacrylic polymer textile material made by the copolymerization by weight of 40% acrylonitrile and 60% vinyl chloride dyed black with a cationic compound defined in claim 1 wherein R, R' and X are methyl and Y is hydrogen.

5. Modacrylic polymer textile material made by the copolymerization by weight of 40% acrylonitrile and 60% vinyl chloride dyed black with a cationic compound defined in claim 1 wherein R and R' are methyl, X is methoxy and Y is hydrogen.

6. Modacrylic polymer textile material made by the copolymerization by weight of 40% acrylonitrile and 60% vinyl chloride dyed black with a cationic compound defined in claim 1 wherein R is ethyl, R' is β-cyanoethyl, X is hydrogen and Y is methyl.

7. Modacrylic polymer textile material made by the copolymerization by weight of 40% acrylonitrile and 60% vinyl chloride dyed black with a cationic compound defined in claim 1 wherein R is ethyl R' is β-cyanoethyl, X is chloro and Y is methyl.

8. Modacrylic polymer textile material made by the copolymerization by weight of 40% acrylonitrile and 60% vinyl chloride dyed black with a cationic compound defined in claim 1 wherein R and R' are β-hydroxyethyl and X and Y are hydrogen.

References Cited by the Examiner
UNITED STATES PATENTS

| | | |
|---|---|---|
| 2,741,605 | 4/1956 | Zwilgmeyer. |
| 2,811,409 | 10/1957 | Clapp et al. _____ 264—206 |
| 2,831,826 | 4/1958 | Coover et al. |
| 2,843,572 | 7/1958 | Wooten et al. |
| 2,906,589 | 9/1959 | Muller et al. |
| 2,957,010 | 10/1960 | Straley et al. _____ 260—377 |
| 2,968,661 | 1/1961 | Straley et al. _____ 260—377 |
| 3,104,932 | 9/1963 | Horn et al. |

OTHER REFERENCES

Colour Index, vol. 3, 2nd ed., 1956, page 3430, CI No. 51,215.

J. TRAVIS BROWN, *Acting Primary Examiner.*

NORMAN G. TORCHIN, J. HERBERT, *Examiners.*